United States Patent [19]
Suzuki

[11] Patent Number: 5,161,137
[45] Date of Patent: Nov. 3, 1992

[54] OPTICAL DISK APPARATUS WITH A PLURALITY OF HEADS

[75] Inventor: Haruyuki Suzuki, Kawasaki, Japan

[73] Assignee: Ricoh Company, Ltd., Tokyo, Japan

[21] Appl. No.: 551,451

[22] Filed: Jul. 10, 1990

[30] Foreign Application Priority Data

Jul. 12, 1989 [JP] Japan .................. 1-180101

[51] Int. Cl.$^5$ .............................................. G11B 7/22
[52] U.S. Cl. .................................. 369/32; 369/44.28; 360/78.06; 360/78.04
[58] Field of Search ............ 369/32, 44.11, 43, 44.27, 369/44.28, 44.29, 44.34, 44.31, 44.25, 54, 124; 360/78.01, 78.06, 78.04

[56] References Cited

U.S. PATENT DOCUMENTS

4,788,671 12/1988 Kanda ............................ 369/13
4,841,502 6/1989 Murakami et al. ................ 369/13

Primary Examiner—Robert L. Richardson
Assistant Examiner—Robert Chevalier
Attorney, Agent, or Firm—Cooper & Dunham

[57] ABSTRACT

An optical disk apparatus comprises a plurality of heads for performing erasure of information from, record of information on, and reproduction of information from an optical disk. Each of the heads is movable in transverse to tracks on the optical disk for seek movement. Head drive system is provided for driving the heads so as to move the heads to a target track on the disk. The head drive system is adapted to apply for the seek movements of the heads a first drive force and a second drive force which is smaller than the first drive force to each of the heads in such a manner that when one of the heads is driven by the first drive force, the other heads can be driven by the second drive force only.

12 Claims, 7 Drawing Sheets

| x | OPTIMUM MODE | PATTERN | SIMLIFIED MODE | PATTERN |
|---|---|---|---|---|
| $0 \sim \frac{1}{4}\alpha Td^2$ | $\beta = 1$ | FIG.2 | $\beta = 1$ | FIG.2 |
| $\frac{1}{4}\alpha Td^2 \sim 2\alpha Td^2$ | $\beta(\geq 0.5)$ DECIDED BY $Td = \frac{3\beta - 1}{\sqrt{\alpha\beta}} \cdot \sqrt{x}$ | FIG.3 | $\beta = 0.5$ | SIMILAR TO FIG.4 |
| $2\alpha Td^2 \sim$ | $\beta(\leq 0.5)$ DECIDED BY $x = \frac{\alpha}{2}\{Td+(1-\beta)\sqrt{\frac{x}{\alpha\beta}}\}^2 + \sqrt{\alpha\beta x} \cdot Td$ | FIG.5 | $\beta = \frac{\alpha Td^2}{x}$ | FIG.6 |

OPTICAL DISK APPARATUS WITH A PLURALITY OF HEADS

BACKGROUND OF THE INVENTION

The present invention relates generally to an optical disk system. More particularly, the invention relates to a head drive system for performing seek movement of each of a plurality of head for erasing information from, recording information on and/or reproducing information from an optical disk such as magnet optical disk.

In an exemplary optical disk apparatus using an erasable optical disk such as magnet optical disk, a head for erasing information from, recording information on and/or reproducing information from the optical disk is driven by a head drive motor for its seek movement. Generally, drive force is applied to the head in the form of a triangular pattern. Namely, the head is first accelerated at a constant acceleration $\alpha$ and then decelerated a the constant acceleration $\alpha$. For this purpose, eclectic current i is supplied from a source to the drive motor through a power amplifier under fixed voltage V.

In this case, when the weight of the head is given as m, the drive force F for moving the head is represented as $F = m\alpha$. Since the acceleration $\alpha$ is in proportion to the current i, the drive force F is also in proportion to the current i. Further, since the voltage V is fixed, an electric power P required to drive the head is represented as $P = Vi$.

Recently, an optical disk system which can perform erasure, record or reproduction of information by using a plurality of heads has been proposed. In this kind of optical disk system, it is easy to simultaneously drive all the heads. However, in this case, an extremely large power will be required. In many cases, the system is designed to have an upper limit of a maximum power consumption. Accordingly, when all the heads are simultaneously driven, the power consumption required to drive the heads is apt to exceed a maximum power consumption, resulting in a breakdown of the system.

On the other hand, when the heads are successively driven in such a manner that after seek movement of one of the heads has been completed, seek movement of the next head is started, a power consumption required to drive the heads can be decreased. However, in this case, when seek distance is relatively long, an overall seek time required to complete all the seek movements of the heads will exceed a permissible time-lag between information recording/reproducing operations effected by the separated heads.

SUMMARY OF THE INVENTION

Therefore, it is an object of the present invention to provide an optical disk apparatus which makes it possible to perform seek movements of a plurality of heads at a minimal power consumption without increasing excessively an overall seek time of the heads.

The object of the invention can be achieved by an optical disk apparatus comprising: a plurality of heads for performing erasure of information from, record of information on, and reproduction of information from an optical disk, each of the heads being movable in transverse to tracks on the optical disk for seek movement; means for driving the heads so as to move the heads to a target track on the disk, the driving means being adapted to apply for the seek movements of the heads a first drive force and a second drive force which is smaller than the first drive force to each of the heads in such a manner that when one of the heads is driven by the first drive force, the other heads can be driven by the second drive force only.

In the above-mentioned optical disk apparatus, when one of the heads is driven by the first drive force, the other heads can be driven by the second drive force which is smaller than the first drive force. Accordingly, electric power consumption required to drive the the heads can be reduced. Further, according to the above-mentioned construction, seek movements of the heads can be partially overlapped in time with each other. Accordingly, overall seek time required for completing all of seek movements of the heads can be reduced without increasing electric power consumption.

Further objects, features and advantages of the present invention will become apparent from the following description of the preferred embodiments of the present invention as illustrated in the accompanying drawings.

DESCRIPTION OF THE PREFERRED EMBODIMENTS

Figure 1:
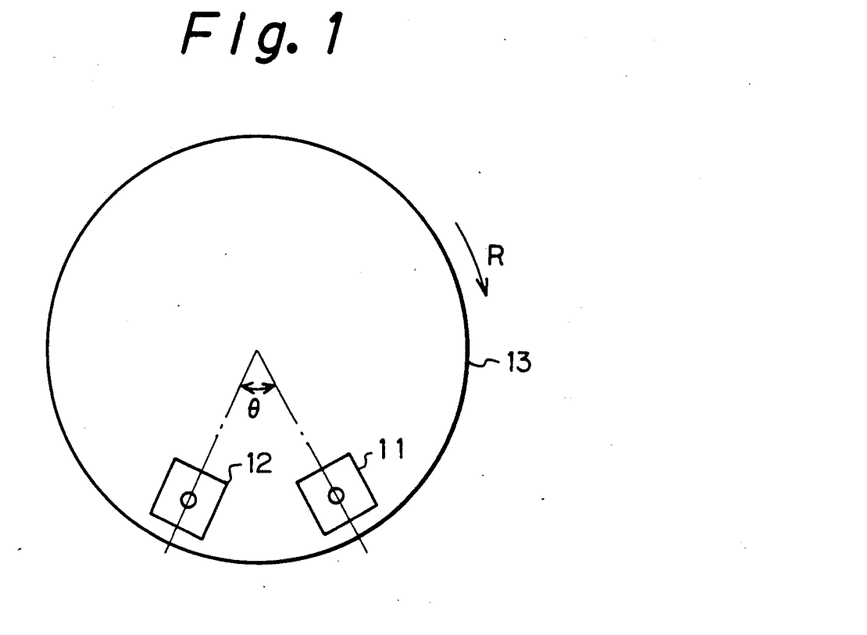
FIG. 1 is a schematical plan view showing, as an example, arrangements of two heads of an optical disk apparatus according to the present invention.

Referring to FIG. 1, there is schematically shown a part of an optical disk apparatus to which the present invention is embodied. In the illustrated apparatus, information can be erased from, recorded on, or reproduced from an optical disk 13 at each of recording tracks thereon by using a plurality of heads. Although in the illustrated embodiment, the optical disk apparatus comprises two heads 11 and 12, it may include three or more heads.

In the illustrated embodiment, the head 11 is used to erase old information from the disk 13 at a selected or target track as well as to record new information on the disk 13 at the selected track, while the head 12 is used to reproduce the information from the track on the disk 13. The heads 11 and 12 are movable across a recording surface of the optical disk 13 along different radial directions of the disk 13, respectively, which are at an acute angle $\theta$ with respect to each other, as shown in FIG. 1. Drive motors (not shown) are provided for performing seek movements of the heads 11 and 12, respectively, to a selected track on the disk 13 at which erasing, recording or reproducing of information is to be performed. The optical disk 13 can be rotated by a spindle motor (not shown) about its center axis in a direction of the arrow R shown in FIG. 1, and thus, the head 11 takes a position behind the head 12 in the direction of rotation of the disk 13.

In the case that for example, erasure of old information from a selected track on the disk 13, record of new information on the selected track from which old information has been erased, and reproduction of the new information from the selected track for the check of the new information recorded thereon are to be successively performed, the heads 11 and 12 are moved to the selected track on the disk 13. After arriving at the selected track, the head 11 is first used to erase old information from the selected track and is then used to record new information on the selected track, and thereafter, the head 12 is used to reproduce the new information from the selected track for the check of the new information recorded thereon.

In the case that for example, the speed of rotation of the optical disk 13 is 4320 rpm, one-rotation time D of the disk is about 14 msec, and time interval d from the time when record of information is performed on the track by the head 11 to the time when reproduction of the information recorded is performed on the track by the head 12 for the check of the information recorded thereon is ordinarily several micro seconds ($d = 14 \times \theta / 360$). Therefore, a time-lag between the times of seek-ending of the heads 11 and 12 may occur as long as it remains within the range of the above-mentioned time interval. Since the heads 11 and 12 are moved to the same selected track, seek distances of the heads 11 and 12 are equal to each other. When one of the heads 11 and 12 is driven at a constant acceleration $\alpha$ for its accelerated or decelerated motion, drive force for accelerating or decelerating the other head at the constant acceleration $\alpha$ is not supplied to the other head, so that electric power consumption required for both the seek movements of the heads 11 and 12 can be reduced. Further, in the case that seek distances of the heads 11 and 12 are not so short, moving times of the heads 11 and 12 are partially overlapped to each other without any overlapping of accelerated/decelerated motions of the heads 11 and 12. Accordingly, overall seek time required for performing seek movements of the heads 11 and 12 can be reduced without increasing electric power consumption.

Explanation will now be made in more detail as to various seek drive characteristics of the optical disk apparatus according to one embodiment of the invention with reference to FIGS. 2 to 7.

Figure 2:
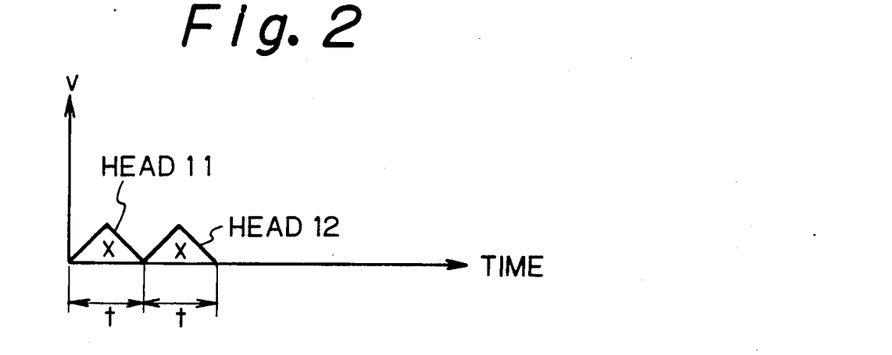
FIGS. 2 to 6 are velocity diagrams for explaining various head drive operations to be effected under various conditions, respectively, according to the invention.

I. In the case that the seek distances of the heads 11 and 12 are relatively short, driving characteristics of a triangular pattern are successively applied to each of the heads 11 and 12, as shown in FIG. 2. That is, after the seek movement of the head 11 according to the triangular drive characteristics has been completed, the seek movement of the head 12 according to the triangular drive characteristics is started.

In this case, when seek time of each of the heads 11 and 12 is indicated at t, a seek distance x of each of the heads 11 and 12 can be represented as follows.

$$x = \frac{1}{2} \alpha \left( \frac{t}{2} \right)^2 \times 2 = \frac{1}{4} \alpha t^2 \tag{1}$$

Therefore, the seek time t can be represented as follows.

$$t = 2 \sqrt{\frac{x}{\alpha}} \tag{2}$$

When a permissible time-lag between the times of seek-ending of the heads 11 and 12 is indicated at Td, it is required that $t \leq Td$, and thus, the following condition has to be satisfied.

$$x \leq \frac{1}{4} \alpha Td^2 \tag{3}$$

II. In the case that the seek distance of each of the heads 11 and 12 is slightly longer than the above-described distance, a time-lag between the times of seek-ending of the heads 11 and 12 will become impermissible when the seek distance x becomes $$x \geq \frac{1}{4} \alpha Td^2 \tag{4}$$

Figure 3:
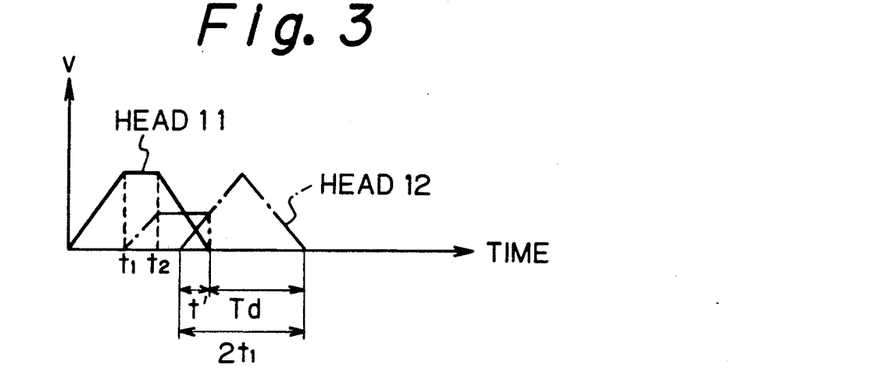

Therefore, in this embodiment, driving characteristics of a trapezoidal pattern are applied to the head 11 for the seek movement, as shown in FIG. 3. That is, after having been accelerated at a constant acceleration $\alpha$ until a predetermined time $t_1$, the head 11 is moved at a constant speed until a predetermined time $t_2$ and is then decelerated at the constant acceleration $\alpha$. On the other hand, in this case, the head 12 is accelerated at the constant acceleration $\alpha$ between the times $t_1$ and $_2$ and is then moved at a constant speed during deceleration of the head 11. Thereafter, the head 12 is accelerated again at the constant acceleration $\alpha$ and is then decelerated again at the constant acceleration $\alpha$.

In this case, when the accelerated/decelerated ratio of the head 11, i.e., the ratio a total distance of accelerated or decelerated movements of the head 11 to the seek distance x, is indicated at $\beta$, the distance of movement of the head 11 from the time of seek-starting of the head 11 to the time $t_1$ becomes $\beta x/2$, while the distance of movement of the head 11 between the times $t_1$ and $t_2$ becomes $(1-\beta)x$, and the distance of movement of the head 11 from the time $t_2$ to the time of seek-ending of the head 11 becomes $\beta x/2$. Therefore, the following relationship is held.

$$\frac{\beta}{2} x = \frac{1}{2} \alpha t_1^2$$

Thus, the time $t_1$ can be represented as $$t_1 = \sqrt{\frac{\beta x}{\alpha}} \tag{4}$$

On the other hand, when it is assumed that $t' = t_1 - t_2$, the following relationship is held.

$$(1-\beta)x = t' \cdot \alpha t_1 \tag{5}$$

From equations (4) and (5) the time t' can be represented as $$t' = \frac{(1-\beta)x}{\sqrt{\alpha \beta x}} \tag{6}$$

Therefore, the following condition according to equations (4) and (6) has to be satisfied.

$$Td \geq 2t_1 - t' = \frac{3\beta - 1}{\sqrt{\alpha\beta}} \cdot x \quad (7)$$

Figure 4:
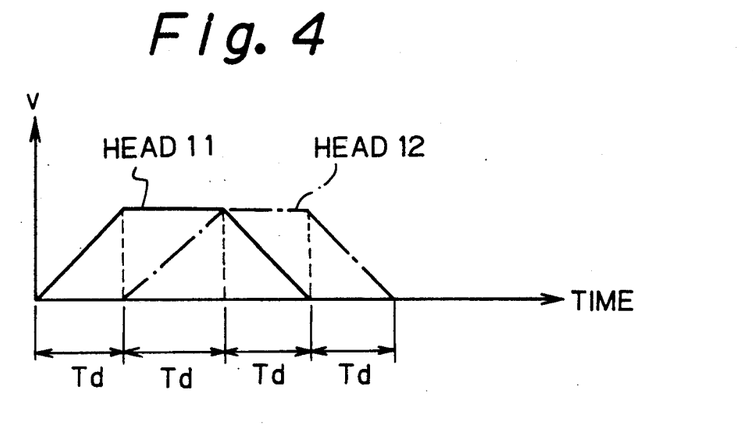

At the limit of the condition of formula (7), driving characteristics having a trapezoidal pattern shown in FIG. 4 must be applied to each of the heads 11 and 12, in which $x = 2\alpha Td^2$. Therefore, in order to ensure that the time-lag between the times of seek-ending of the heads 11 and 12 is made equal to the permissible time-lag Td under the condition of $\alpha Td/4 \leq 2\alpha \leq 2\alpha Td^2$, the driven distance ratio $\beta$ is required to satisfy the condition of formula (7).

Figure 5:
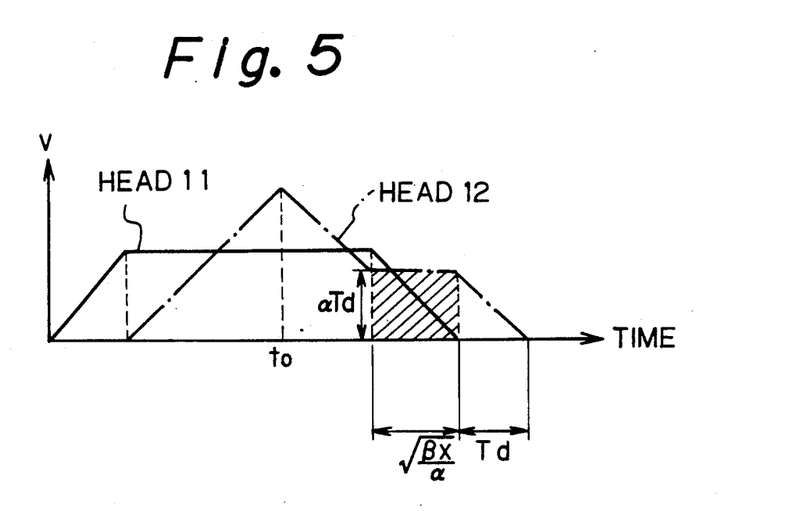

III. In the case that the seek distance is more longer than the above-described distance, when the seek distance x becomes $x \geq 2\alpha Td^2$, the driven distance ratio $\beta$ of the head 11 has to become smaller than that of the head 12. In this case, therefore, driving characteristics of a trapezoidal pattern are applied to the head 11, as shown in FIG. 5. That is, after having been accelerated at a constant acceleration $\alpha$, the head 11 is moved at a constant speed and is then decelerated at the constant acceleration $\alpha$. On the other hand, in this case, the head 12 is accelerated at the constant acceleration $\alpha$ from the time of acceleration-ending of the head 11 to time $t_0$ and is then decelerated at the constant acceleration $\alpha$. Thereafter, the head 12 is moved at a constant speed during decelerated motion of the head 11 and is then decelerated at the constant acceleration $\alpha$.

Figure 8:
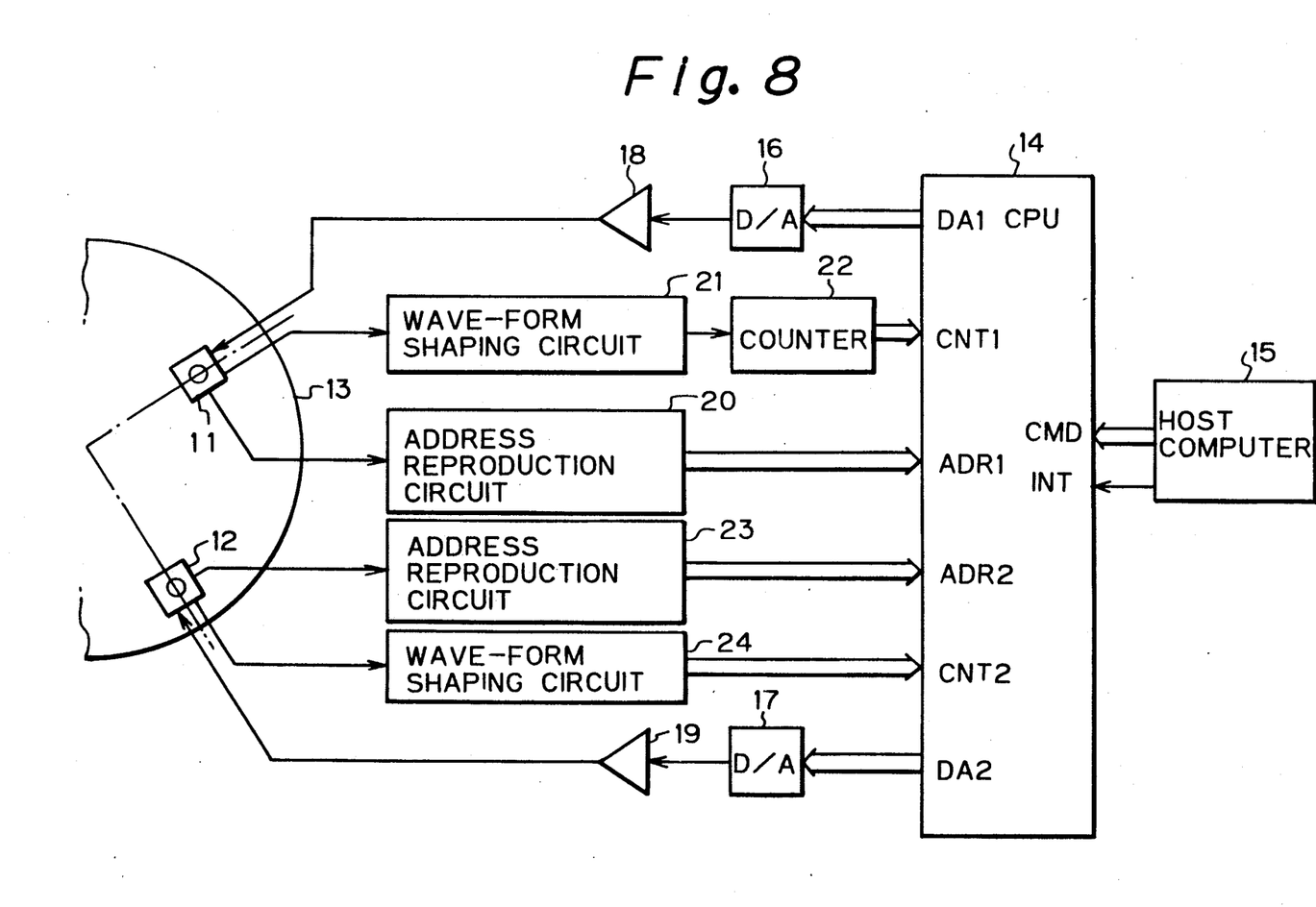
FIG. 8 is a block diagram of electronic circuitry of the optical disk apparatus constructed in accordance with the invention.

In FIG. 8, the seek distance of the head 12 is represented by an area Sa of the region which is bounded by the one-dotted lines and which is composed of a shadowed portion and the rest triangular portion which, in turn, represents the seek distance x of the head 12, i.e., the sum of distances of accelerated or decelerated sections in the overall seek movement of the head 12. An area Sb of the shadowed portion can be represented as $$Sa = \sqrt{\frac{\beta x}{\alpha}} \cdot \alpha Td = \sqrt{\alpha\beta x} \cdot Td \quad (8)$$

in order to obtain an area Sc of the triangular portion, the time $t_0$ will now be found. At the right side of a point of the time $t_0$, the triangular portion has a straight line passing through a point which can be represented by $$\left( t = (1 - \beta)\sqrt{\frac{x}{\alpha\beta}}, v = \alpha Td \right)$$

Thus, when the straight line of the triangular portion at at the right side of the point of the time $t_0$ is assumed as $v = -\alpha t + b$, the following equation can be held.

$$\alpha Td = -\alpha(1 - \beta)\sqrt{\frac{x}{\alpha\beta}} + b \quad (9)$$

Therefore, the straight line of the triangular portion at at the right side of the point of the time $T_0$ can be found as $$v = -\alpha\{t - (Td + (1 - \beta)\sqrt{x\alpha\beta})\} \quad (10)$$

Next, when it is assumed that $v(t_0) = \alpha(t_0)$, the time $t_0$ can be represented as $$t_0 = \frac{1}{2}\left( Td + (1 - \beta)\sqrt{\frac{x}{\alpha\beta}} \right) \quad (11)$$

According to equations (8) and (11), the seek distance x can be represented as $$x = \alpha t_0^2 + \alpha\beta x \cdot Td \quad (12)$$
$$= \frac{1}{2}\alpha\left( Td + (1 - \beta)\sqrt{\frac{x}{\alpha\beta}} \right)^2 + \sqrt{\alpha\beta x} \cdot Td$$

Therefore, when the value of driven distance ratio $\beta$ is decided in accordance with the value of seek distance x so as to satisfy the condition of equation (12), the time-lag between the times of seek-ending of the heads 11 and 12 always becomes equal to the permissible time-lag Td.

Figure 6:
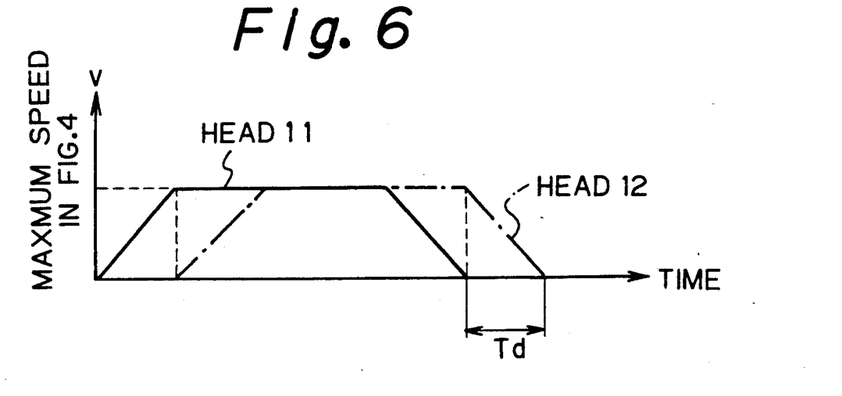

The above-described condition of the driven distance ratio $\beta$ in each of the cases of items (I) and (II) can provide optimum mode of driving characteristics to the heads 11 and 12 which make it possible to minimize the seek time of the head 11 while restricting the time-lag between the times of seek-ending of the heads 11 and 12 to be equal to the permissible time-lag Td. However, according to the present invention, more simplified driving characteristics may be applied to the heads 11 and 12. For example, in the case of item (II), driving characteristics of a trapezoidal pattern may be applied, as a simplified mode, to the head 12 by fixing the driven distance ratio $\beta$ to $\beta = 0.5$. Also in the case of item (III), driving characteristics of a trapezoidal pattern may be applied, as a simplified mode, to the head 12, as shown in FIG. 6, in which maximum speed of the head 12 is flattened in correspondence to that shown in FIG. 4. In this case, from $\beta x = \alpha Td^2$, the driven distance ratio $\beta$ is decided so as to satisfy $\beta = \alpha Td^2/x$.

Figure 7:
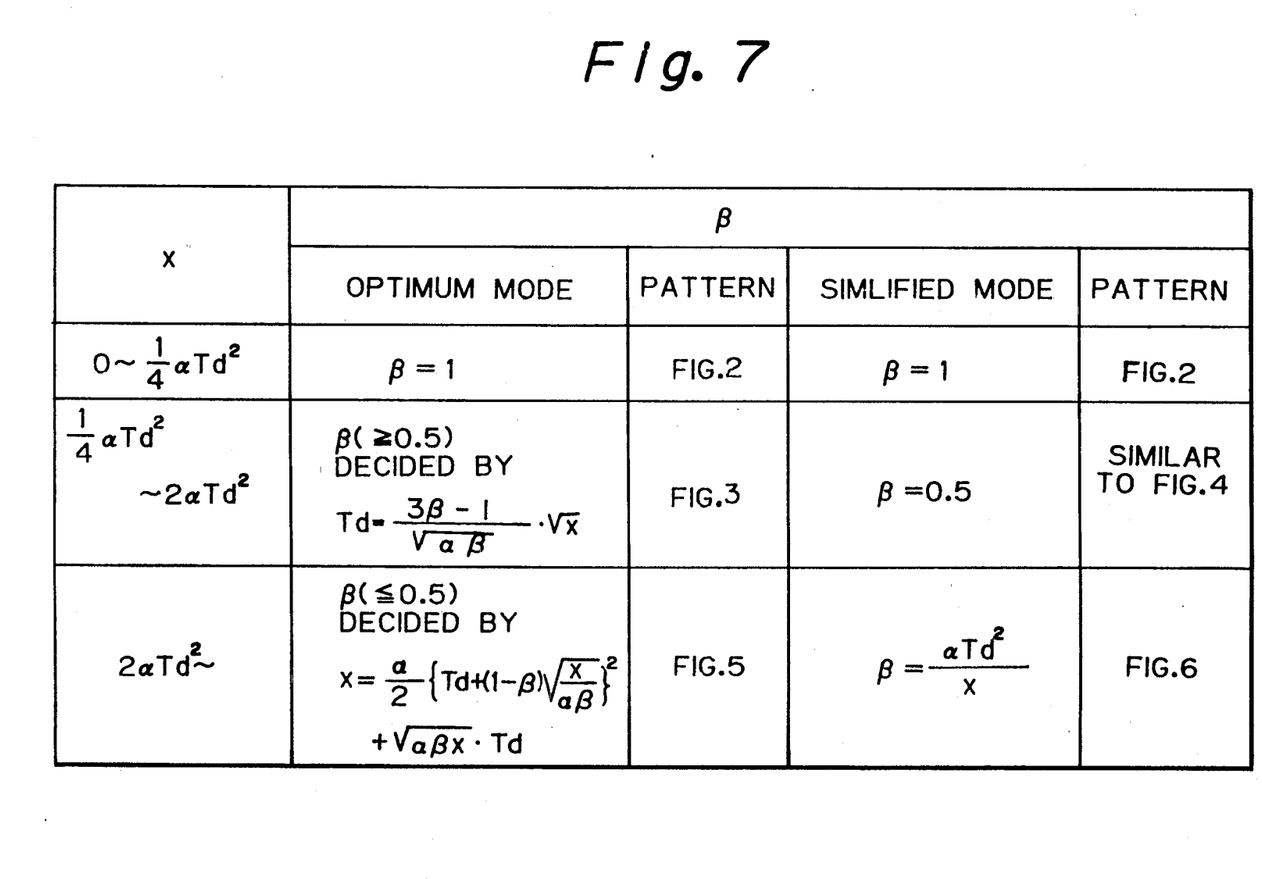
FIG. 7 is a view showing various conditions for the head drive operations according to one and another embodiments of the invention.

FIG. 7 shows the list of relationships between x and $\beta$ in the above-described optimum and simplified modes of head driving characteristics.

Figure 9:
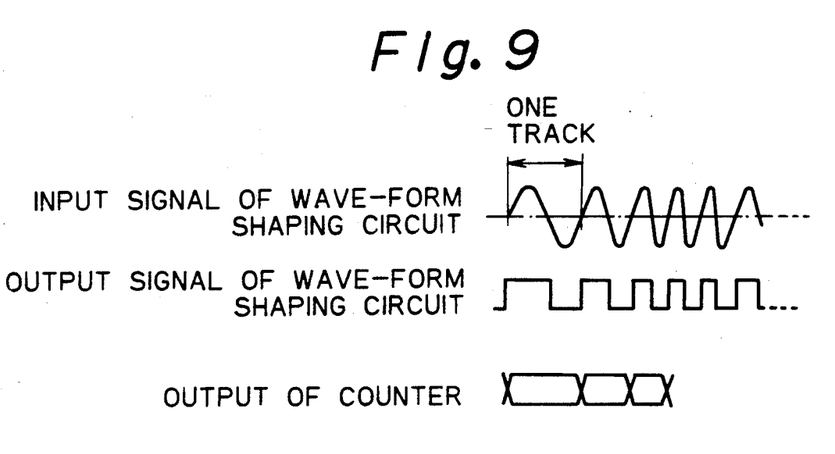
FIG. 9 is a timing chart of input/output signals generated in the circuitry shown in FIG. 8.

FIG. 8 illustrates an example of electronic circuitry for driving the heads 11 and 12, and FIG. 9 is a timing chart of input/output signals generated in the circuitry shown in FIG. 8.

Referring to FIGS. 8 and 9, a micro computer (CPU) 14 executes a predetermined process on the basis of commands from a host computer 15 and generate head drive signals which are sent to digital to analog (D/A) converters 16 and 17, respectively, in which the head drive signals are each converted from an analog form to a digital form. Then, the head drive signals are sent from the D/A converters 16 and 17 to power amplifiers 18 and 19, respectively, in which the head drive signals are amplified. Then, the head drive signals are sent from the power amplifiers 18 and 19 to the above-described head drive motors (not shown), respectively, which are driven by the head drive signals to move the heads 11 and 12 along the radial directions of the optical disk 13, respectively, toward a selected track on the disk.

After the heads 11 and 12 have arrived at the selected track on the disk 13, the head 11 serves to illuminate the selected track of the disk 13 with laser light to perform erasure of information from or record of information on the track, while the head 12 serves to illuminate the selected track of the disk 13 with laser light and then receive the laser light reflected therefrom to perform reproduction of information.

On the other hand, during the seek movement of the head 11, it also serves to successively illuminate the tracks on the disk 13 with laser light and to successively receive the laser light reflected from the tracks on the disk 13 in order to output information signals recorded on the track. An address reproduction circuit 20 serves to take address information signals each representing the address of one of the tracks from the information signals and output them to the CPU 14. Further, the information signals from the head 11 are wave-form shaped by a wave-form shaping circuit 21 into track count signals (see FIG. 9) which are then counted by a counter 22, and then, an output signal representing the number of signals counted is sent from the counter 22 to the CPU 14.

Similarly, an address reproduction circuit 23 serves to take address information signals each representing the address of one of the tracks from the information signals and output them to the CPU 14. Further, the information signals from the head 12 are wave-form shaped by a wave-form shaping circuit 24 into track count signals which are then counted by the counter 22, and then, an output signal representing the number of signals counted is sent to the CPU 14.

Figure 10:
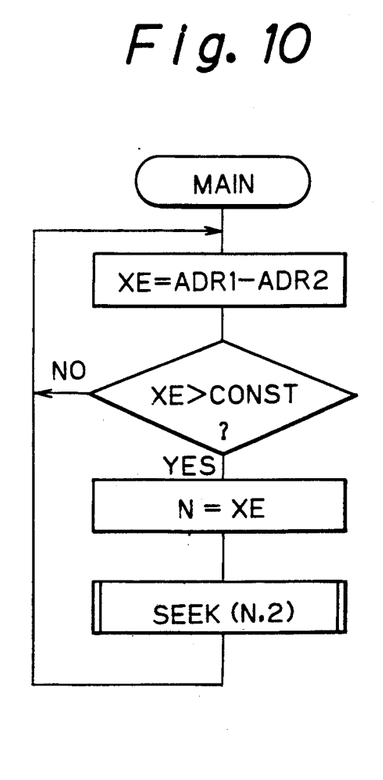
FIGS. 10 to 12 are flowcharts illustrating various operations executed by a central processing unit (CPU) of the circuitry.
Figure 11:
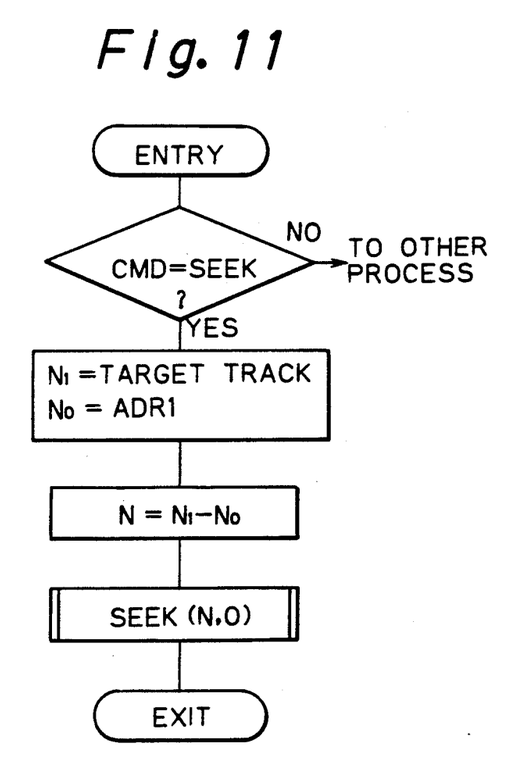
Figure 12:
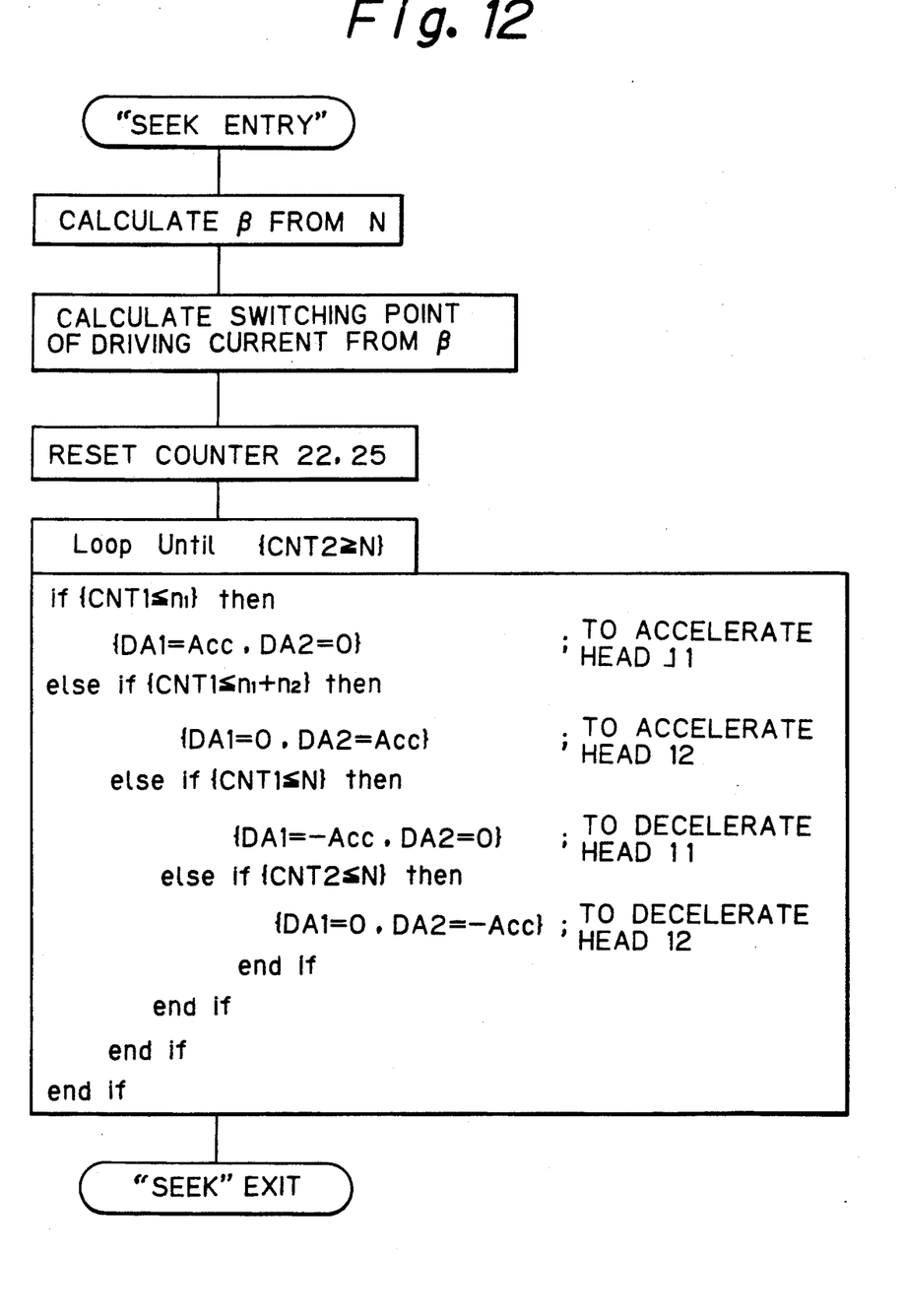

FIGS. 10 to 12 show flowcharts for explaining a program to be executed by the CPU 14.

Referring first to FIG. 10, there is shown a main routine of the program in which the difference XE between two addresses of tracks at which the heads 11 and 12 take positions, respectively, is repeatedly obtained on the basis of track address signals ADR1 and ADR2 supplied from the address reproduction circuit 20 and 23, and the difference XE obtained is also repeatedly compared with a certain value CONST until XE becomes greater than CONST. When XE becomes greater than CONST, the CPU 14 generates head drive signals which are then sent to the D/A converter 17. In this way, the head 12 is moved at the distance XE so that both the heads 11 and 12 can be positioned at the same track on the disk 13. Therefore, the track is followed with the heads 11 and 12 until the CPU 14 receives any access command CMD from the host computer 15.

When a seek command SEEK from the host computer 15 is received in the CPU 14, i.e., CMD=SEEK, as shown in FIG. 11, the number N of tracks between the address number $N_1$ of a target or selected track which is obtained by the seek command and the address number $N_0$ of the present track at which the head 11 takes its position and which is obtained by the track address signal ADR1 is obtained by $N=N_1-N_0$. In the next seek routine SEEK(N, MODE), the heads 11 and 12 are moved at the number N of tracks obtained.

In this embodiment, seek routine SEEK(N, MODE) includes three modes, i.e., a seek routine SEEK(N, 0) of mode-0, a seek routine SEEK(N, 1) of mode-1, and a seek routine SEEK(N, 2) of mode-2. In the seek routine SEEK(N, 0) of mode-0, the heads 11 and 12 are moved at the number N of tracks on the basis of the head drive signals sent from the CPU 14 to the D/A converters 16 and 17, respectively. On the other hand, in the seek routine SEEK(N, 1) of mode-1, only the head 11 is moved at the number N of tracks on the basis of the head drive signal sent from the CPU 14 to the D/A converter 16, while in the seek routine SEEK(N, 2) of mode-2, only the head 12 is moved at the number N of tracks on the basis of the head drive signal sent from the CPU 14 to the D/A converter 17.

More specifically, for example, in the seek routine SEEK(N, 0) of mode-0, as shown in FIG. 12, the above-described driven distance ratio $\beta$ is first calculated from N, according to the relationship between x and $\beta$ in the optimum or simplified mode shown in Fog. 7. Thereafter, switching points $n_1$, $n_2$, and $n_3$ of driving current for the heads 11 and 12 are calculated from the following equations.

$$N = n_1 + n_2 + n_3$$

$$n_1 = \beta\, N/2$$

$$n_2 = (1-\beta)N$$

$$n_3 = \beta\, N/2$$

Next, the CPU 14 reset the counters 22 and 25 and sends a head drive signal ACC to the D/A converter 16, and thus the head 11 is accelerated at a constant acceleration $\alpha$ until the count value CNT1 of the counter 22 becomes equal to $n_1$. Also the CPU 14 sends a head drive signal ACC to the D/A converter 17, and thus the head 12 is accelerated at a constant acceleration $\alpha$ after the count value CNT1 of the counter 22 has become equal to $n_1$ until the count value CNT1 thereof becomes equal to $n_1+n_2$. Further, the CPU 14 sends a head drive signal $-$ACC to the D/A converter 16, and thus the head 11 is decelerated at a constant acceleration $\alpha$ until the count value CNT1 of the counter 22 becomes equal to N.

Figure 13A:
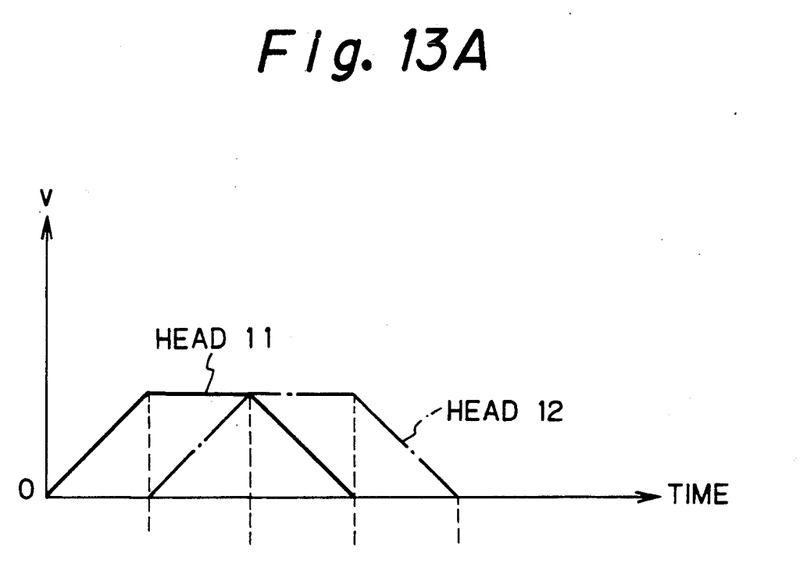
FIGS. 13A and 13B is a diagram illustrating head drive characteristics of the optical disk apparatus according to the invention.
Figure 13B:
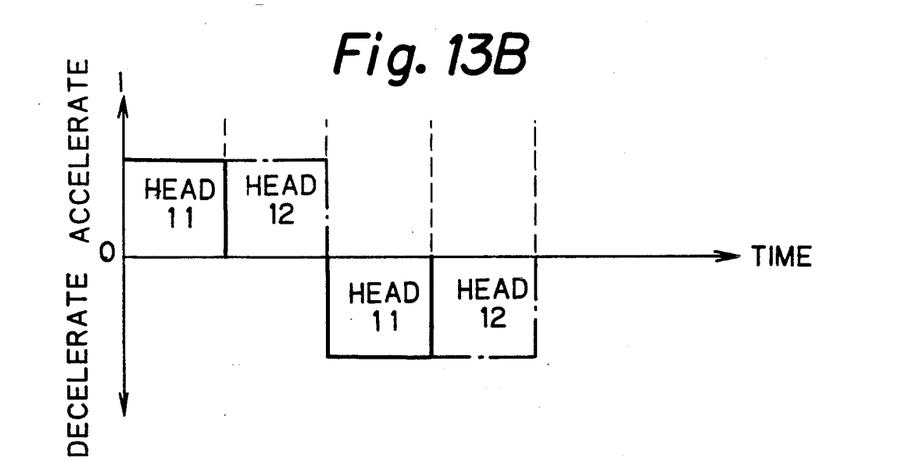

According to the above-described embodiment, as shown in FIG. 13, the optical disk system makes it possible to drive the heads 11 and 12 in the form of triangular or trapezoidal pattern without overlapping the driving currents i for the heads 11 and 12 with each other. Therefore, the system requires electric power consumption for the seek movement of only one of heads during seek movements of the heads 11 and 12 due to alternate power supply the respective heads 11 and 12. Moreover, since the head 12 starts to move during movement of the head 11 under the above driving condition, that is, the seek motions of the heads 11 and 12 are overlapped in time with each other, it becomes possible to speed up the time of seek-ending of the head 12 and thereby to shorten an overall seek time of the heads 11 and 12.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. An optical disk apparatus comprising:
   a plurality of heads for performing erasure of information from, record of information on, and reproduction of information from an optical disk, each of said heads being movable in transverse to tracks on the optical disk for seek movement;

means for driving the heads so as to move the heads to a target track on the disk, said driving means being adapted to apply for the seek movements of the heads a first drive force decided to accelerate or decelerate each of the heads at a substantially constant acceleration and a second drive force which is smaller than the first drive force and decided to move each of the heads at a substantially constant speed to each of the heads in such a manner that when one of the heads is driven by the first drive force, the other heads can be driven by the second drive force only.

2. An optical disk apparatus according to claim 1, wherein a ratio of moving distance of each of the heads obtained by the first drive force to a seek distance thereof is so decided that a time-lag between times of seek-ending of the heads remains substantially within a predetermined permissible range.

3. An optical disk apparatus according to claim 1, wherein the seek movements of the heads are partially overlapped in time to each other.

4. An optical disk apparatus according to claim 1, wherein the seek movements of the heads are started with a time-lag therebetween.

5. An optical disk apparatus comprising:
 a plurality of heads for performing erasure of information from, record of information on, and reproduction of information from an optical disk, each of said heads being movable in transverse to tracks on the optical disk for seek movement;
 means for driving the heads so as to move the heads to a target track on the disk, said driving means being adapted to apply for the seek movements of the heads a first drive force and a second drive force which is smaller than the first drive force to each of the heads in such a manner that when one of the heads is driven by the first drive force, the other heads can be driven by the second drive force only, wherein the seek movements of the heads are partially overlapped in time to each other.

6. An optical disk apparatus according to claim 5, wherein the ratio of moving distance of each of the heads obtained by the first drive force to a seek distance thereof is so decided that a time-lag between times of seek-ending of the leads remains substantially within a predetermined permissible range.

7. An optical disk apparatus according to claim 5, wherein the seek movements of the heads are started with a time-lag therebetween.

8. An optical disk apparatus according to claim 5, wherein the first drive force is decided to accelerate or declerate each of the heads at a constant acceleration, while the second drive force is decided to move each of the heads at a constant speed.

9. An optical disk apparatus comprising:
 a plurality of heads for performing erasure of information from, record of information on, and reproduction of information from an optical disk, each of said heads being movable in transverse to tracks on the optical disk for seek movement;
 means for driving the heads so as to move the heads to a target track on the disk, said driving means being adapted to apply for the seek movements of the heads a first drive force and a second drive force which is smaller than the first drive force to each of the heads in such a manner that when one of the heads is driven by the first drive force, the other heads can be driven by the second drive force only, wherein the seek movements of the heads are started with a time-lag therebetween.

10. An optical disk apparatus according to claim 9, wherein the ratio of moving distance of each of the heads obtained by the first drive force to a seek distance thereof is so decided that a time-lag between times of seek-ending of the leads remains substantially within a predetermined permissible range.

11. An optical disk apparatus according to claim 9, wherein the seek movements of the heads are partially overlapped in time to each other.

12. An optical disk apparatus according to claim 9, wherein the first drive force is decided to accelerate or decelerate each of the heads at a constant acceleration, while the second drive force is decided to move each of the heads at a constant speed.

* * * * *